United States Patent

[11] 3,587,168

| [72] | Inventor | Tadeusz W. Kolator<br>London, Ontario, Canada |
|---|---|---|
| [21] | Appl. No. | 778,909 |
| [22] | Filed | Oct. 28, 1968<br>Division of Ser. No. 519,610, Jan. 10, 1966. |
| [45] | Patented | June 28, 1971 |
| [73] | | Assignee to Canadian Westinghouse<br>Company, Limited, Hamilton, Ontario,<br>Canada |

[54] METHOD OF MAKING INSULATED ELECTRICAL APPARATUS
6 Claims, 4 Drawing Figs.

[52] U.S. Cl. .................................................. 29/605,
29/602, 336/94, 336/96, 336/205, 336/206
[51] Int. Cl. ............................................... H01f 7/06
[50] Field of Search .......................................... 29/602,
605; 336/94, 96, 173, 174, 205, 206; 252/63.5,
63.7, 63; 117/61, 102

[56] References Cited
UNITED STATES PATENTS

| 2,531,156 | 11/1950 | Piercy et al. .................. | 117/61 |
| 2,682,626 | 6/1954 | Robinson et al. .............. | 117/61X |
| 2,924,264 | 2/1960 | Imhof ........................... | 336/174X |
| 3,138,773 | 6/1964 | Nichols et al. ................. | 336/94X |

FOREIGN PATENTS

| 660,056 | 3/1963 | Canada ....................... | 336/96 |

Primary Examiner—John F. Campbell
Assistant Examiner—Carl E. Hall
Attorneys—F. Shapoe and Alex Mich, Jr.

ABSTRACT: Layers of fibrous insulation are disposed between layers of conductors to provide an electrical coil assembly. The assembly is heated to drive off moisture. The dried coil is impregnated with an insulating oil. Excess oil is removed, most conveniently by heating the coil to an elevated temperature. The assembly is covered with a liquid epoxy resin and heated to from a solidified resinous jacket. The jacket prevents the escape of the insulating coil in the fibrous insulation. In the completed assembly, the multiple layers of insulation, disposed between conductor layers, retain the insulating oil and provide high dielectric strength, high corona starting levels and low dielectric losses between the conductor turns.

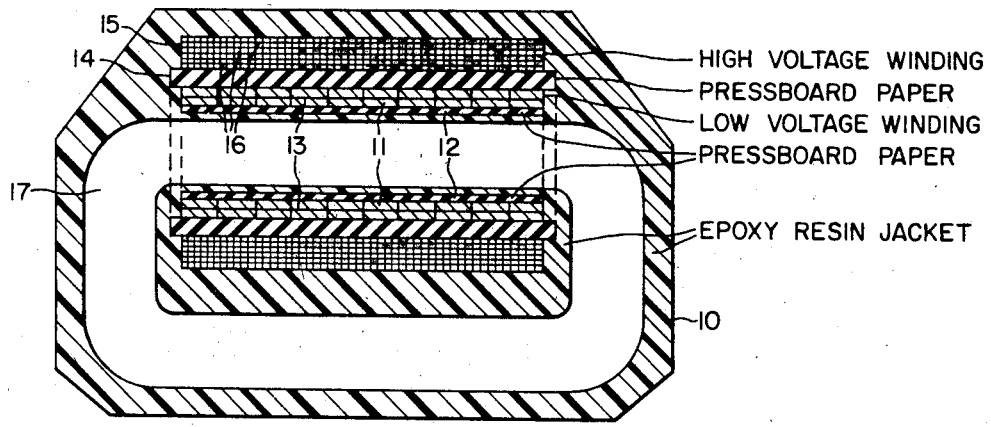

PATENTED JUN 28 1971          3,587,168

FIG. 1.
PRIOR ART

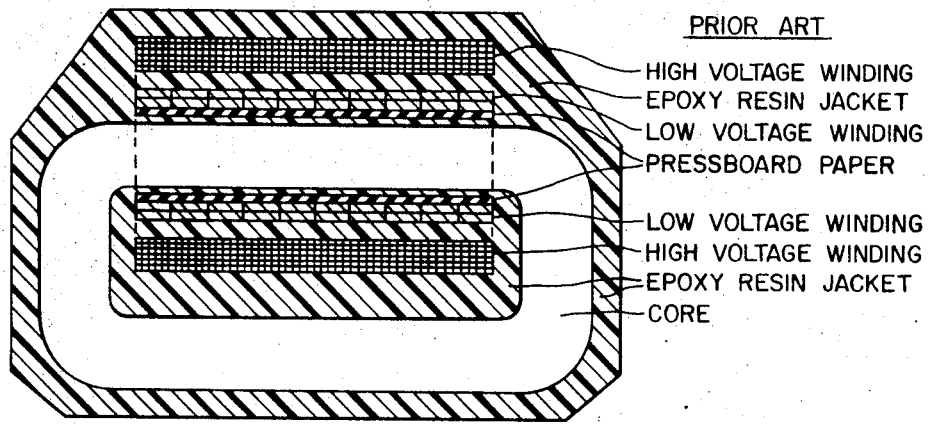

- HIGH VOLTAGE WINDING
- EPOXY RESIN JACKET
- LOW VOLTAGE WINDING
- PRESSBOARD PAPER
- LOW VOLTAGE WINDING
- HIGH VOLTAGE WINDING
- EPOXY RESIN JACKET
- CORE

FIG. 2.

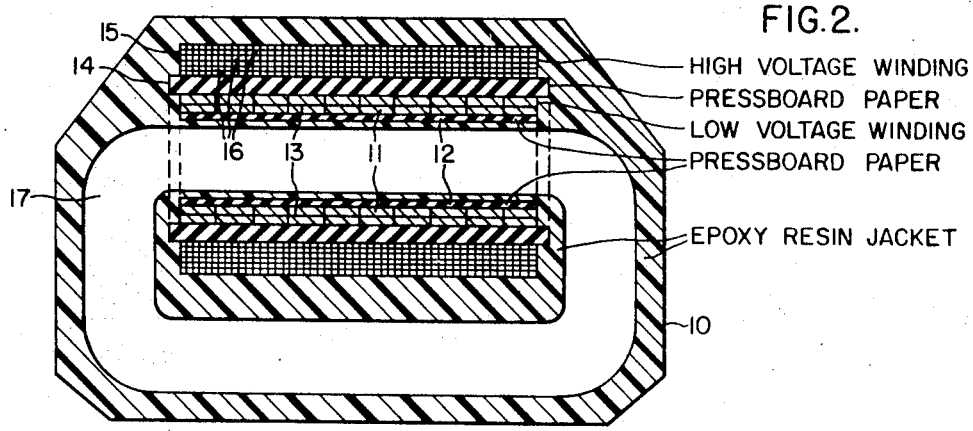

- HIGH VOLTAGE WINDING
- PRESSBOARD PAPER
- LOW VOLTAGE WINDING
- PRESSBOARD PAPER
- EPOXY RESIN JACKET

FIG. 3.

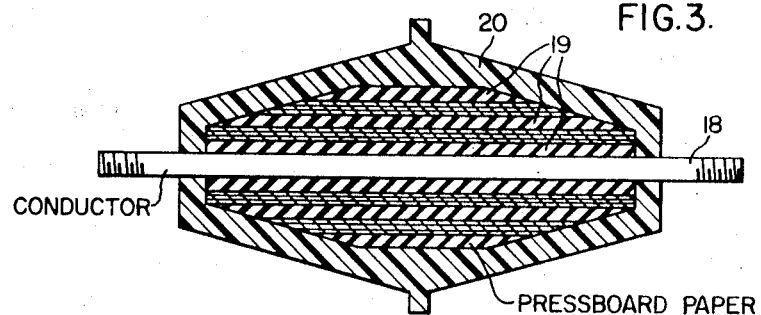

- CONDUCTOR
- PRESSBOARD PAPER

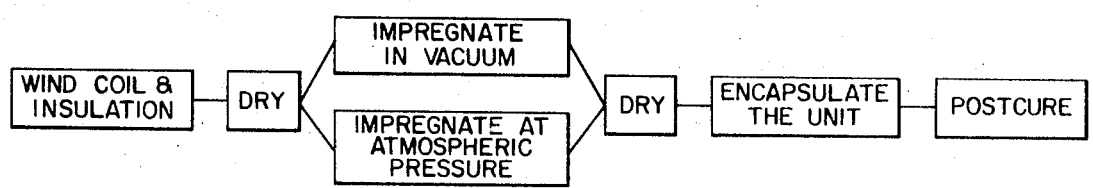

FIG. 4.

WITNESSES
Theodore F. Wrobel
James F. Young

INVENTOR
Tadeusz W. Kolator
BY Alex Mich Jr.
ATTORNEY 3,587,168

METHOD OF MAKING INSULATED ELECTRICAL APPARATUS

CROSS-REFERENCE TO RELATED APPLICATIONS

This is a division of application Ser. No. 519,610, filed Jan. 10, 1966.

BACKGROUND OF THE INVENTION

This invention relates to electrical apparatus having oil impregnated fibrous insulation which is encapsulated with epoxy resin to achieve superior performance by improving the electrical properties of the insulation.

One basic requirement of electrical apparatus is that the apparatus must be able to withstand short periods of severe electrical stresses, such as may be involved in testing the apparatus, and yet be able to withstand moderate stresses for relatively long periods. To ensure a long service life of the apparatus, it is important to have insulation arranged in such a way as to decrease or even eliminate corona. If corona persists at normal working conditions over a period of time, the insulation may fail thermally, due to electrolysis of molecular disintegration, and cause failure of the apparatus in question. Also, high dielectric loses in electrically stressed areas, can cause spot overheating and thus lead to destruction of insulation and subsequent failure of the entire apparatus.

The prior art electrical apparatus is exemplified by FIG. 1 which shows an epoxy impregnated and epoxy encapsulated transformer. This transformer is wound in a normal way, and is subsequently heated to remove moisture from the fibrous insulation followed by a resin impregnating operation and an encapsulating operation. Both operations can be performed simultaneously using a proper epoxy resin that will impregnate the insulation and encapsulate the entire coil at the same time. However, in spite of the very high dielectric strength of this type of insulation and in addition to other physical and mechanical properties of this type of insulation, the corona inception or starting level is low and the dielectric losses are high. Both of the shortcomings are particularly detrimental to the service life of any apparatus above a rating of 2.5 KV. The high dielectric loss is an inherent feature of epoxy resins. Low corona inception of corona starting voltage is due to many reasons such as the occulusion of air bubbles in the epoxy, unavoidable shrinkage, poor adhesion of the epoxy to the insulation paper, and the inherently poor quality of epoxy resin as an impregnant.

SUMMARY OF THE INVENTION

Accordingly, it is an object of this invention to provide new and improved electrical apparatus having insulation of a high dielectric strength and a corona inception much higher than in conventional insulation, while dielectric losses are kept to a minimum.

It is another object of this invention to provide a method for producing electrical apparatus which readily lends itself as a technique for providing insulation having high dielectric strength, high corona starting levels and low dielectric loses.

Briefly, the above objects are accomplished in accordance with the present invention, by providing electrical apparatus having fibrous insulation that is initially oil-impregnated and then epoxy-encapsulated. The methods of the present invention include the steps of drying the apparatus and associated fibrous material, impregnating the fibrous material with an insulating oil, removing excess oil from the outer surface of the material, encapsulating the apparatus with its associated oil-impregnated fibrous material with an epoxy resin and curing the epoxy resin.

Further objects and advantages of the invention will become apparent as the following description proceeds and features of novelty which characterize the invention will be pointed out in particularity in the claims annexed to and forming a part of this specification.

BRIEF DESCRIPTION OF THE DRAWING

For a better understanding of my invention, reference may be had to the accompanying drawings, in which:

FIG. 1 is a sectional view of a prior art epoxy impregnated epoxy-encapsulated transformer widely used in low voltage electric systems;

FIG. 2 is a sectional view of an oil-impregnated epoxy encapsulated transformer which embodies the present invention;

FIG. 3 is a sectional view of an embodiment of the present invention as applied to insulating bushings; and FIG. 4 is a flow diagram of the process of my invention.

DESCRIPTION OF THE PREFERRED EMBODIMENTS

Referring now to FIG. 2 of the drawings, a transformer 10 embodying the invention is shown having a low voltage winding 11 wound on a pressboard tube 12, the winding being of insulated wire, for example, wire coated with a resinous enamel, such as polyvinyl formal or any other suitable magnet wire enamel, having paper 13 or other fibrous material inserted in between the layers of the winding 11. Suitable fibrous insulation such as cloth, paper, pressboard and the like may also be wound about individual conductors or be placed between adjacent turns of the winding 11 if necessary. There is then applied another layer 14 over the low voltage winding 11 to provide the low voltage to high voltage barrier insulation. This consists of a number of layers of paper, pressboard, or other fibrous sheet material sufficient to withstand standard voltage testing procedures without breakdown, as well as to provide a sufficiently high corona inception point.

A standard high voltage winding 15 is wound directly on the barrier layer 14, this winding being a wire enameled or insulated in a manner similar to that of the wire in winding 11. Paper insulation 16 or any other suitable fibrous material is inserted between the layers of the winding to provide the necessary high voltage insulation between coil layers.

A core formed of any suitable magnetic material is placed in space 17. This may be done prior to oil impregnation or prior to resin encapsulation whichever is more convenient to the manufacturer.

The whole coil (with or without the core) is assembled as a unit and is subsequently dried. The drying process is carried out at an elevated temperature preferably between 220° and 275° F. for a period of varying from 2 to 8 days, dependent on the temperature used and the size of transformer undergoing the drying operation, the larger units generally requiring a greater time. A shorter period of time may be employed if the drying is carried out under vacuum.

The dried unit (coil or coil and core assembly) is then allowed to cool to room temperature or slightly above, as between 86° and 104° F. After the unit has reached a temperature within these limits it is placed in an impregnating tank where a vacuum oil impregnation process takes place. A hydrocarbon base insulating oil such as cable or transformer oil is employed as the impregnant. The impregnating oil which I have found to be the most satisfactory is a refined petroleum base cable oil having the general characteristics contained in the following table;

| | Approximately 10%, by weight |
|---|---|
| Aromatic content: | |
| Vicosity at 100° F., cs. | 7.14 |
| Vicosity at 210° F., cs. | 2.02 |
| Vicosity Index | 77.5 |
| Specific gravity at 60° F. | [1] 0.880 |
| Vapor pressure at 60° F., mm. Hg. | 0.18 |
| Vapor pressure at 80° F. mm. Hg. | 0.13 |

[1] Typical.

A vacuum of about 2 mm. of Hg. is drawn on the tank containing the oil and the apparatus to be impregnated. The pressure of 2 mm. is held until all evolution from the apparatus undergoing impregnation ceases. At this time the vacuum is removed and the pressure in the tank is restored to atmospheric pressure to force the oil into the apparatus and further improve the impregnation. This period can be from 2 to 5 minutes depending on the size of the apparatus undergoing impregnation. Superatmospheric pressure, as form a nitrogen gas cylinder can be applied to increase the rapidity of oil penetration into all pores and interstices.

When it appears that the oil impregnation is complete, the unit is removed from the tank and the excess oil is allowed to drain off the apparatus. The unit may be tested at this time to insure that the unit has been adequately impregnated. The unit may be subjected directly to an operation such as blowing air or centrifuging to remove the excess oil from the apparatus. The oil removal preferably is accomplished by heating the unit in an oven at approximately 257° F. until the unit ceases dripping. The outside of the unit will be visibly wet with impregnating oil.

The unit is then removed from the heating oven and allowed to cool to a temperature of 220° F. to insure an even temperature distribution throughout the unit. The hot unit is then subjected to a vacuum epoxy resin encapsulation operation.

The unit is next vacuum encapsulated in a suitable liquid epoxy resin. A resin which I have found to be most suitable is an epoxy resin curable to a semirigid state using an acid anhydride catalyst, having the following characteristics:

| | Four hours at 125° C. |
|---|---|
| Curing Time: | |
| Cured vicosity, Brookfield cps. | 800 |
| Cured tensile strength, p.s.i. | 4,700 |
| Cured Shore D Hardness | 87 |
| Elongation to break at room temperature, percent | 30 |

An example of a suitable formulation for the epoxy resin encapsulant consists, by weight, of 100 parts of a liquid epoxy resin having an equivalent weight of about 175-220, 175 parts of dodecenyl succinic anhydride, 3 parts of benzyl dimethyl amine and 410 parts of 325 mesh silica. The formulation will have a relatively low viscosity at elevated temperatures to insure a good flow and penetration of the apparatus and produce a suitable jacket to retain the oil within the interstices of the insulation. The filler will make the cured resin less susceptible to cracking due to stresses from thermal cycling.

The foregoing epoxy resin formulation is mixed and a vacuum is drawn in a suitable chamber containing the formulation and the units to be encapsulated. The electrical units will have been placed in suitable moulds ready for encapsulation. A vacuum of between 5 to 7 mm. of Hg. is necessary to produce a high degree of evolution of contained gases in the epoxy. This pressure is held until virtually all the gas evolution has ceased in the epoxy. The vacuum is decreased to between 20 and 23 mm. of Hg. (the larger units requiring less vacuum) and the resin is introduced into the moulds containing the hot oil apparatus.

When all the moulds are filled with epoxy to the desired level, the vacuum is broken and the mould and epoxy are subjected to atmospheric pressure for about one-half hour before the units are moved. The moulds containing the units with the epoxy resin encapsulant are transferred to an oven which is maintained at about 257° F. and held there fore a period varying from approximately 1¼ to 1½ hours. At the end of this time the excess and flash on the cured epoxy jacket is trimmed off and the unit now fully encapsulated in epoxy resin is removed from the mould. The unit is then post cured for a period of from about 3 to 6 hours at a temperature of 250° F.

It must be understood that the foregoing process is continuous and once the moisture removing operation is initiated, the succeeding operations that necessarily follow must be completed without any long delay.

Referring now to FIG. 3, a bushing is shown having a construction similar to the transformer described above. A conductor rod 18 capable of carrying high voltage current is wrapped with paper 19, pressboard or a similar fibrous material which may be wrapped directly on the conducting rod 18 or on a close fitting paper tube which is initially placed upon and surrounds the conducting rod 18. The insulation is then dried and is impregnated with an insulating oil such as the oil described previously. The excess oil is removed from the insulation and the encapsulation operation follows to mould an epoxy jacket 20 on to the insulated rod as shown in FIG. 3. A suitable post curing period as previously described is employed to complete the manufacture of the bushing. FIG. 4 shows the sequence of operations in the proper order to produce an epoxy encapsulated oil impregnated transformer or bushing.

Variations are possible in the technique as shown in FIG. 4. For instance, an alternative to vacuum impregnation is simple impregnation by the ordinary process which follows from immersing a previously dried piece of apparatus in a warm oil bath. An appreciable increase in time is required in the latter case so that the impregnation will be just so complete. Suitable impregnating oils include such electrical insulating oils as for example, transformer oils and cable oils. These oils are refined hydrocarbons and the preferred oil is cable oil, as noted hereinbefore, because of its relatively high aromatic content. Chlorinated liquid insulating materials are not suitable as they react with the epoxy resin.

Numerous epoxy resin formulations are suitable for use as an encapsulating or casting resin in this invention. The formulations can comprise a liquid epoxy and/or epoxy novolac resin, a filler material and an acid anhydride curing or crosslinking resin. An accelerator may be employed to provide a cure within reasonable times at the curing temperatures, e.g. about 225-250° F. The liquid epoxy resins are known in the art and may be prepared, for example, by reacting at least one polyhydric phenol with at least one eiphalohydrin in an alkaline medium. Suitable phenols include, for example, bisphenol A, while epichlorohydrin is the preferred epihalohydrin. Aqueous mixtures of alkali metal hydroxides, with the relatively inexpensive sodium hydroxide being preferred.

Suitable epoxy novolac resins may be prepared by condensing an epihalohydrin with a novolac resin of an aldehyde and a monohydric mononuclear alkyl phenol containing at least four carbon atoms in the alkyl group, which novolac resin contains about 3 to 12 phenoloc hydroxyl groups per average molecule. The term "novolac" as used herein refers to phenolaldehyde resins prepared by reacting at least one phenol with at least one aldehyde in the ratio of 1 mol of phenol to from about 0.5 to 0.85 mol of aldehyde using an acidic catalyst. The condensation is effected by mixing the novolac resin with at least 3 mols of an epihalohydrin such as epichlorohydrin per phenolic hydroxyl equivalent of novolac resin and with addition of about 1 mol of alkali metal hydroxide per phenolic hydroxyl equivalent of novolac resin. The reaction mixture is maintained within the range of about 60° C. to 150° C. during the ensuing reaction. Upon completion of the reaction, the formed alkali metal salt and any unreacted hydroxide are removed from the resulting epoxy-novolac resin and the resultant epoxy-novolac, in the form of a viscous liquid or solid, is separated from the reaction mixture and may be purified, if required.

The epoxy-novolac resins may vary from very viscous liquids to solids at normal temperatures (20° C.). Even the normal solid resins are fusible. The resins have a very complicated chemical structure. Analysis indicates that the majority such as about 60 to 90 or more percent of the hydrogen atoms of the phenolic hydroxyl group of the original novolac resin are replaced by glycidyl radicals. The epoxy-novolac resin also contain an appreciable proportion of alcoholic hydroxyl groups which are largely present in 2,3-dihydroxypropyl radicals that have replaced hydrogen atoms of phenolic hydroxyl groups of the original novolac resin. A small proportion of chlorine is contained in the resin, some of which is present in 3-chloro-2-hydroxy propyl groups and some in more complicated groups which are 3-chloro-2-(3- chloro-2- hydroxylpropyloxy) propyl and 3-chloro-2-(2,3-epoxy-propyloxy) propyl radicals linked to the phenolic ether oxygen atoms in the epoxy resin. The product may contain an insignificant amount of phenolic hydroxyl groups, i.e., at most, less than about 0.3 per average molecule.

Additional anhydrides which may be employed are hexahydrophthalic anhydride, tetrahydrophthalic anhydride, and mixtures of eutectics thereof. The anhydrides are used in amounts of about 50–90 parts by weight for each 100 parts by weight of epoxy resin and/or epoxy novolac. Other anhydrides such phthalic, maleic, and methyl nadic anhydride may also be present in small amounts up to about 20 percent by weight of the primary anhydrides.

It is desirable to employ a small amount, within the range of about 0.05–2.0 parts by weight, of an accelerator for each 100 parts of the gylcidyl polyether. The accelerators are selected from the group consisting of organic amines, metal amine chelates, amine borates, and polyborate esters. One or more of the accelerators may be employed simultaneously. Examples of suitable amines includes monethanolamine, piperidine, diethanolamine, triethanolamine, ethylenediamine, diethylenetriamine, dimethylaminopropylamine, pyrrolidine, and dimethylaminomethyl phenol. The metallic amine chelates which may form a portion of the curing catalyst of this invention may be prepared by initially reacting 1 mol of a metal ester, having the general formula $M(OR)_4$, in which R is one to four carbon atoms, with 2 mols of triethanolamine and distilling off 2 mols of the low boiling alcohol ROH where R represents the organic radical in the metal ester. Suitable metallic amine chelates which may be used in this invention include titanium amine chelate, aluminum amine chelate and silicon amine chelate. Particularly satisfactory results have been achieved when the metal amine chelate of this invention is titanium amine chelate.

Suitable mineral fillers include finely divided silica, quartz, beryllium aluminum silicate, lithium aluminum silicate and the like. Relatively large amounts of filler are desirable in order to provide a cured solid jacket that will resist cracking from thermal cycling. Since it is also desirable for the encapsulating or casting formulation to have a relatively low viscosity, at least when heated to about 100° C., there is some upper limit of about 80–85 percent, by weight, for the filler. The filler may also be inclined in amounts as low as 40–50 percent where massive metal elements that have a considerable degree of expansion and contraction are not present, The principles for selecting filler ranges are well known in the art. It should be understood that the term epoxy resin is intended to include epoxy resin encapsulating and casting formulations that include either epoxy or epoxy novolac resins together with appropriate catalysts, fillers, coloring pigments, etc.

The advantages of this invention are particularly apparent when 15 KV units impregnated and encapsulated with epoxy resin are compared to the oil-filled epoxy jacketed units of this invention in corona starting levels. The epoxy units have a corona level in the order of 1 to 4 KV while the oil-filled units of this invention have corona initiation levels in the order of 10 to 13 KV.

While there have been shown and described what are at present considered to be the preferred embodiments of the invention, modifications will readily occur to those skilled in the art. It is not desired, therefore, that the invention be limited to the specific arrangements shown and described and it is intended to cover in the appended claims all such modifications as fall within the true spirit and scope of the invention.

I claim:

1. A method of making an epoxy encapsulated oil impregnated transformer comprising the steps:
   A. winding insulated electrical conductors into turns, to form at least two different windings including a high voltage winding and a low voltage winding and inserting fibrous electrically insulating material between the high voltage winding and low voltage winding and between each layer of the high voltage winding and the low voltage winding, followed by
   B. drying the fibrous insulating material at an elevated temperature to remove moisture followed by
   C. impregnating the fibrous insulating material with an insulating oil comprising an nonchlorinated hydrocarbon liquid having an aromatic content of about 10 percent by weight, followed by
   D. removing the excess oil from the outer surface of the insulating material by heating the transformer above 220° F. in an oven, followed by
   E. cooling the transformer to about 220° F, placing the cooled transformer in a suitable mould and then vacuum encapsulating said cooled transformer with a anhydride catalyzed epoxy resin, and finally
   F. curing the resin at an elevated temperature to form a solidified jacket about the transformer.

2. The method of claim 1 wherein the impregnation is effected by a vacuum impregnation process between about 86° and 104° F.

3. The method of claim 2 wherein the transformer is encapsulated in a vacuum of between about 5 to 7 mm. of Hg. with epoxy resin containing 40 to 85 weight percent filler particles.

4. A method of making an epoxy-encapsulated oil-impregnated bushing comprising the steps:
   A. winding a fibrous, electrically insulating material around a conductor, followed by
   B. drying the fibrous insulating material at an elevated temperature to remove moisture, followed by
   C. impregnating the fibrous insulating material with an insulating oil comprising a nonchlorinated hydrocarbon liquid having an aromatic content of about 10 percent by weight followed by
   D. removing the excess oil from the outer surface of the insulating material by heating the bushing about 220° F in an oven, followed by
   E. cooling the bushing to about 220° F, placing the cooled bushing in a suitable mould and then vacuum encapsulating said cooled bushing with a filled anhydride catalyzed epoxy resin, and finally
   F. curing the resin at an elevated temperature to form a solidified jacket about the bushing.

5. The method of claim 4 wherein the impregnation is effected by a vacuum impregnation process between about 86° and 104° F.

6. The method of claim 5 wherein the housing is encapsulated in a vacuum of between about 5 to 7 mm. of Hg. with epoxy resin containing 40 to 85 weight percent filler particles.